(12) United States Patent
Doh (10) Patent No.: US 11,274,694 B2
(45) Date of Patent: Mar. 15, 2022

(54) PUSH NUT FOR VEHICLE

(71) Applicant: NIFCO KOREA, INC., Chungcheongnam-do (KR)

(72) Inventor: Yoo Sung Doh, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 118 days.

(21) Appl. No.: 16/739,546

(22) Filed: Jan. 10, 2020

(65) Prior Publication Data

US 2020/0362901 A1 Nov. 19, 2020

(30) Foreign Application Priority Data

May 15, 2019 (KR) .......................... 10-2019-0057146

(51) Int. Cl.
*F16B 21/18* (2006.01)
*F16B 37/08* (2006.01)

(52) U.S. Cl.
CPC ................................ *F16B 37/0842* (2013.01)

(58) Field of Classification Search
CPC .................................................. F16B 37/0842
USPC ......................... 411/102, 103, 108, 111, 516
See application file for complete search history.

(56) References Cited

U.S. PATENT DOCUMENTS

| 3,145,753 A * | 8/1964 | Kreider ................. | F16B 37/041 411/112 |
| 3,574,899 A | 4/1971 | Fisher | |
| 3,999,583 A * | 12/1976 | Nelson ................... | F16B 37/041 411/182 |
| 4,883,382 A * | 11/1989 | Mushya ................ | F16B 5/0233 411/182 |
| 5,039,264 A * | 8/1991 | Benn ...................... | F16B 37/041 411/175 |

(Continued)

FOREIGN PATENT DOCUMENTS

| DE | 22 09 688 | 3/1972 |
| DE | 10 2006001 741 A1 | 8/2007 |

(Continued)

OTHER PUBLICATIONS

Office Action dated Sep. 24, 2020 relating to German Application No. 10 2020 200 445.5, 6 pages.

(Continued)

*Primary Examiner* — Gary W Estremsky
(74) *Attorney, Agent, or Firm* — Stinson LLP (57) ABSTRACT

Push nuts for cars, comprising a head having a member contact surface formed protruding in left and right sides, and having a fastening hole formed penetrating at the center; and a body having formed penetrating at the center, a fastening hole having the same inner diameter and center as the fastening hole which is formed at the head, characterized in that the body and the head are connected to a connecting bridge that elastic deformation is performed outwards, and the head and the body connected with the connecting bridge respectively have a head axial force support and a body axial force support formed protruding toward a space, the head axial force support and the body axial force support having fastening holes having the same center as the fastening holes respectively formed penetrating.

2 Claims, 8 Drawing Sheets

(56) References Cited

U.S. PATENT DOCUMENTS

| | | | | |
|---|---|---|---|---|
| 5,599,148 A * | 2/1997 | Hirose | ................... | B60N 3/046 |
| | | | | 411/112 |
| 5,871,320 A * | 2/1999 | Kovac | ................. | F16B 37/0842 |
| | | | | 411/182 |
| 5,944,467 A * | 8/1999 | Yuta | ................... | F16B 37/0842 |
| | | | | 411/433 |
| 6,287,064 B1 * | 9/2001 | Jhumra | ................ | F16B 37/043 |
| | | | | 411/112 |
| 7,896,596 B2 * | 3/2011 | Rausch | ................ | F16B 37/041 |
| | | | | 411/174 |
| 7,985,042 B1 * | 7/2011 | Paxton | ............... | F16B 37/0842 |
| | | | | 411/527 |
| 8,316,514 B2 * | 11/2012 | Sano | .................. | B60R 13/0206 |
| | | | | 24/297 |
| 8,701,265 B1 * | 4/2014 | James | ............... | B64D 11/0696 |
| | | | | 29/525.01 |
| 2004/0131442 A1 * | 7/2004 | Dieckmann | ........... | F16B 37/043 |
| | | | | 411/112 |
| 2006/0034671 A1 * | 2/2006 | Castro | ................ | F16B 37/0842 |
| | | | | 411/437 |
| 2007/0223991 A1 | 9/2007 | Motsch et al. | | |
| 2008/0286066 A1 | 11/2008 | Paquet | | |
| 2011/0044782 A1 * | 2/2011 | Lange | .................... | F16B 5/065 |
| | | | | 411/2 |
| 2015/0152910 A1 * | 6/2015 | Aoshima | ............. | F16B 37/0842 |
| | | | | 411/116 |
| 2015/0362003 A1 * | 12/2015 | Tseng | .................... | F16B 21/02 |
| | | | | 411/103 |

FOREIGN PATENT DOCUMENTS

| | | |
|---|---|---|
| GB | 1 318 165 | 5/1973 |
| WO | 2013/112513 A1 | 8/2013 |

OTHER PUBLICATIONS

Chinese Office Action, Application No. 201911173445.9, dated Aug. 3, 2021, 8 pages.

* cited by examiner

PUSH NUT FOR VEHICLE

TECHNICAL FIELD

Aspects of the present invention relate to push nuts for vehicles, such as automobiles. More specifically, aspects of the present invention relate to push nuts for vehicles that can be easily assembled and disassembled, and that are not damaged during maintenance such that they can be reused.

BACKGROUND

Generally, push nuts for cars are middle parts for obtaining effects of dustproof, soundproof and waterproof, by blocking tiny gaps occurring between a member and a fastening member when coupling the member with another member or a part to be mounted by using a fastening member such as a screw.

Here, conventional push nuts for cars comprise a head having a member contact surface formed protruding at left and right sides, and having a fastening hole formed penetratingly at a central part; and a body having a fastening hole formed penetratingly at a central part, the fastening hole having the same inner diameter and center as the fastening hole that is formed at the head, and a hook jaw formed protruding in left and right sides.

The conventional push nuts for cars are characterized in that if the body having a hook jaw formed protruding in left and right sides is pushed into a hole formed in a member, the member contact surface of the head formed on the lower portion of the body comes in close contact with the outer side surface of the member, and the body which has been led into the hole such that the member contact surface contacts the outer side surface of the member becomes fixed by the hook jaw such that it does not fall out of the member.

However, for the conventional push nuts for cars, there were problems that due to the hook jaw being fixedly formed protruding at the left and right side of the body, when the body is inserted into the hole formed on the member, the hook jaw becomes deformed because it contacts with the internal wall of the hole, and causes deformation and damage to areas around a member where a hole is formed.

Meanwhile, conventionally, due to the body being inserted into the hole of the member and becoming fixed by the hook jaw such that it does not fall out of the member, there were problems where it is difficult to perform a repair because the push nuts cannot be separated from the member.

SUMMARY

The purpose of the present invention was contrived in order to solve the conventional problems as described above, and is in providing push nuts for vehicles, such as cars, according to which, the body is led in and out through the hole of the member while the hole of the member is elastically deformed, and at the same time, deformation due to excessive fastening is prevented when the body couples a member with another member or a part to be mounted by using a fastening member such as a screw.

In an aspect, the present invention which is for achieving the purpose described above, is the same as the conventional technology in comprising a head 110 having a member contact surface 111 formed protruding at left and right sides, and having a fastening hole 112 formed penetratingly at a central part; and a body 120 having a fastening hole 121 formed penetratingly at a central part, the fastening hole 121 having the same center and inner diameter as the fastening hole 112 that is formed at the head 110.

However, in an aspect the present invention is achieved by the feature that the body 120 and the head 110 are connected by a connecting bridge 160 that has an elastic deformation outwardly, and the head 110 and the body 120 connected by the connecting bridge 160 respectively have a head axial force support 140 and a body axial force support 130 formed protruding toward a space 150 respectively, the head axial force support 140 and the body axial force support 130 respectively having fastening holes 132, 142, which have the same center as the fastening holes 112, 121, formed penetratingly.

Meanwhile, the head axial force support 140 and the body axial force support 130 have contact surfaces 141, 131 formed cut and mutually opposite to each other.

Moreover, an upper portion of the contact surface 141 of the head axial force support 140 and a lower portion of the contact surface 131 of the body axial force support 130 have rotation direction supports 131a, 141a respectively formed in a slope in order to prevent deformation due to excessive fastening with a fastening member 400 such as a screw.

Meanwhile, the internal walls of the fastening holes 112, 121, 132, 142 are tapped for easy fastening with a fastening portion 410 of the fastening member 400 such as a screw.

According to the present invention, the body is led in or out through the hole of the member as the bridge is elastically deformed, thereby preventing not only the body and bridge from being deformed even when the body is led in or led out of the hole formed in the member, but also areas around the member where the hole is formed from being deformed even when the body is inserted into the hole formed in the member.

Meanwhile, according to the present invention, when the body couples a member with another member or a part to be mounted by using a fastening member such as a screw, deformation due to excessive fastening is prevented, and thus the present invention is very useful.

Other objects and features will be in part apparent and in part pointed out hereinafter.

DETAILED DESCRIPTION

Hereinafter, technological features of the present invention will be explained in more detail with reference to the attached drawings, as follows.

Figure 1:
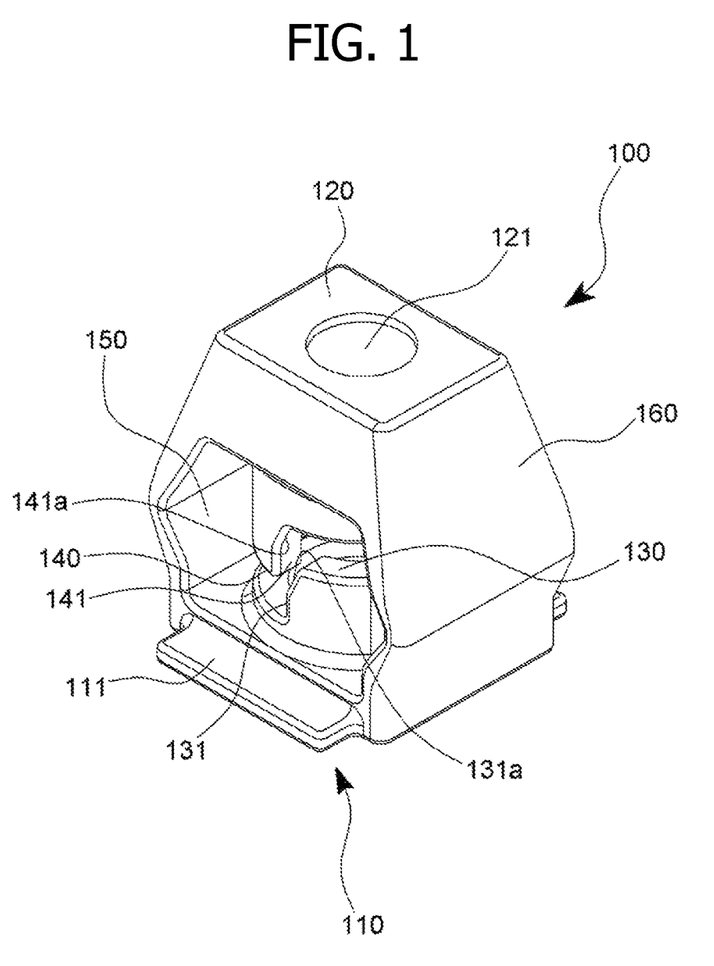
FIG. 1 is a perspective view showing push nuts for cars according to an embodiment.
Figure 2:
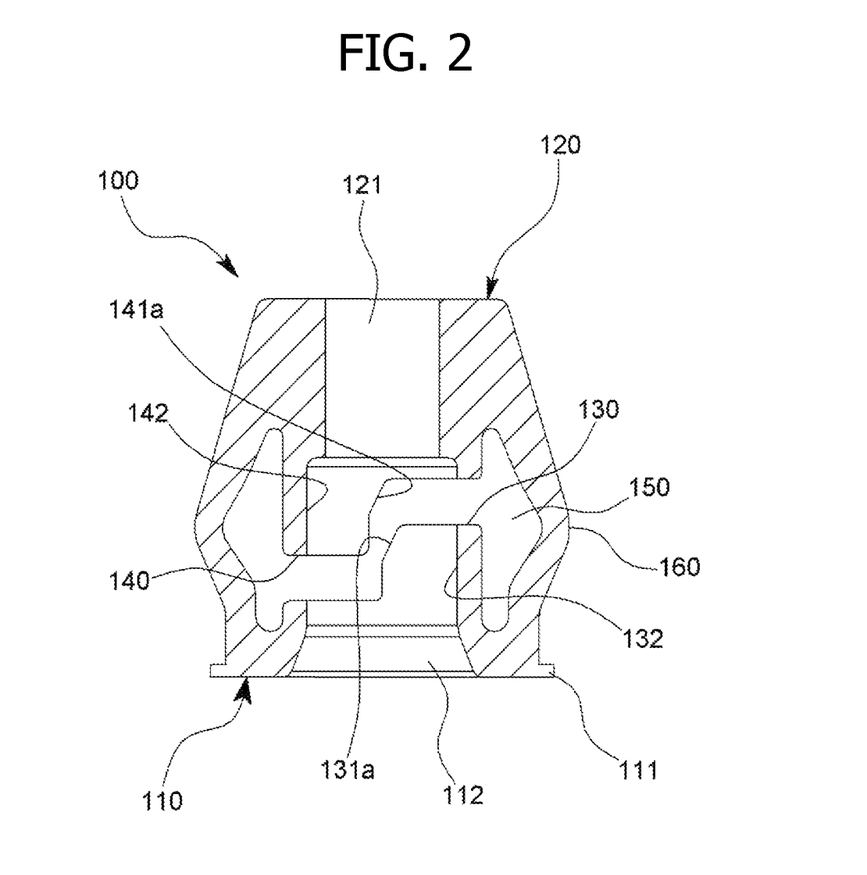
FIG. 2 is a cross-sectional view showing push nuts for cars according to an embodiment.
Figure 3:
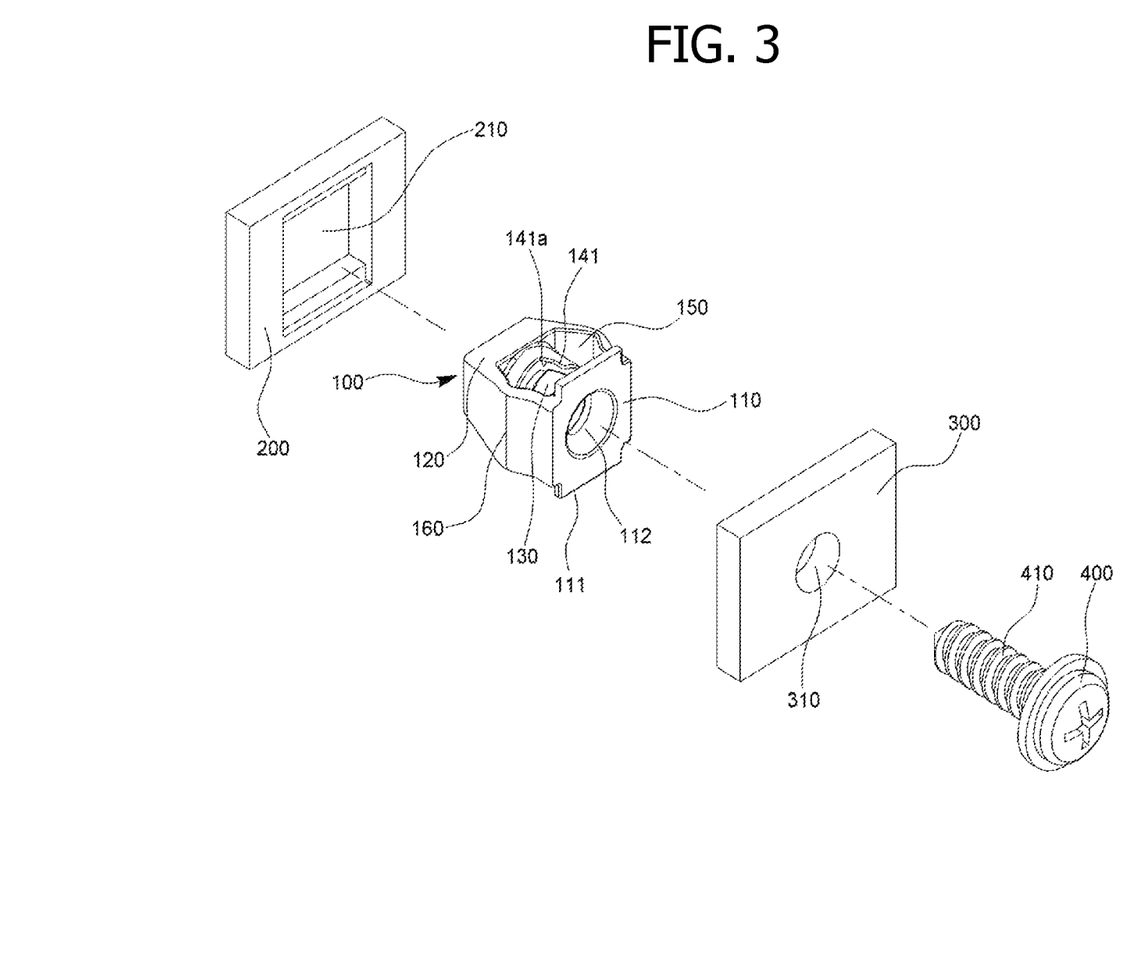
FIG. 3 is an exploded perspective view showing a state of use of push nuts for cars according to an embodiment.
Figure 4:
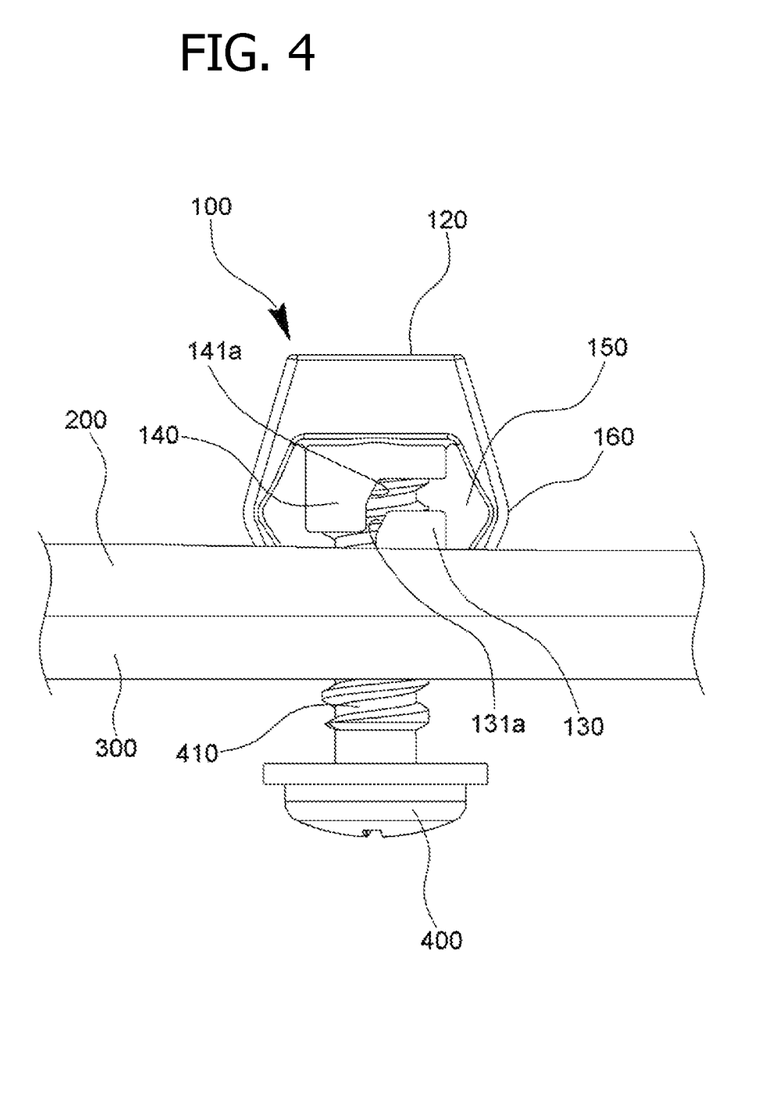
FIG. 4 is a front view showing a state before a member and another member are coupled by push nuts for cars according to an embodiment.
Figure 5:
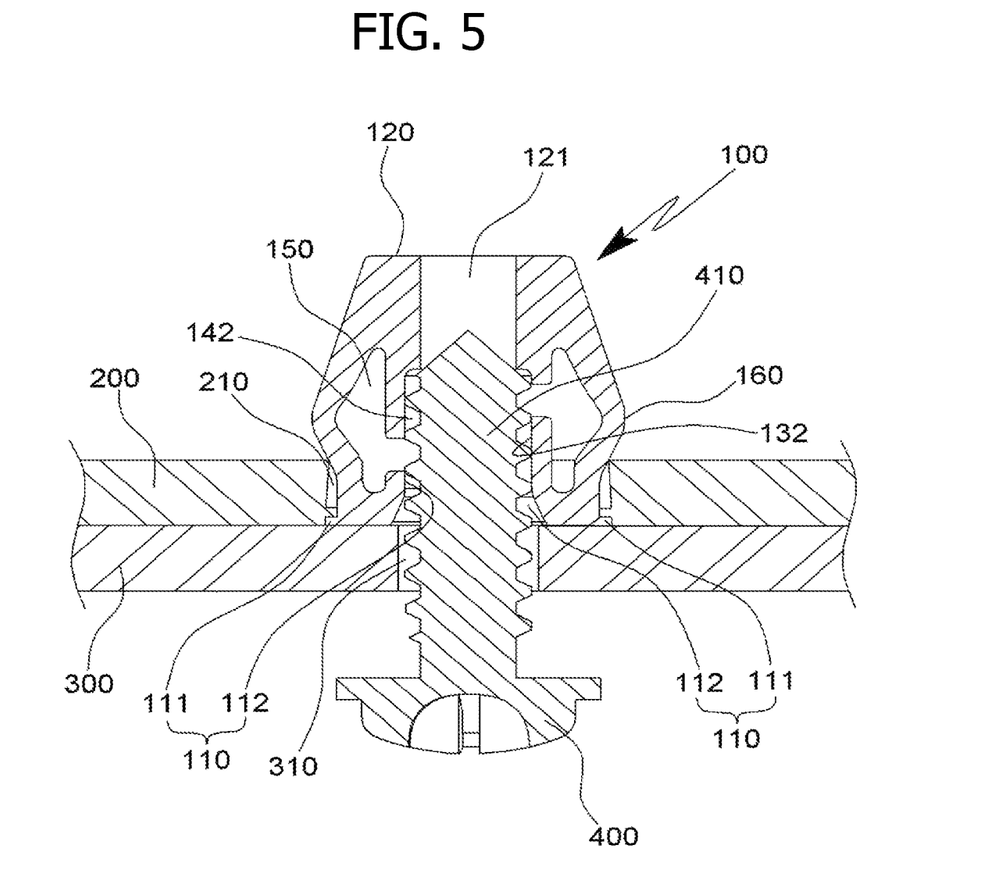
FIG. 5 is a cross-sectional view showing a state before a member and another member are coupled to push nuts for cars according to an embodiment.
Figure 6:
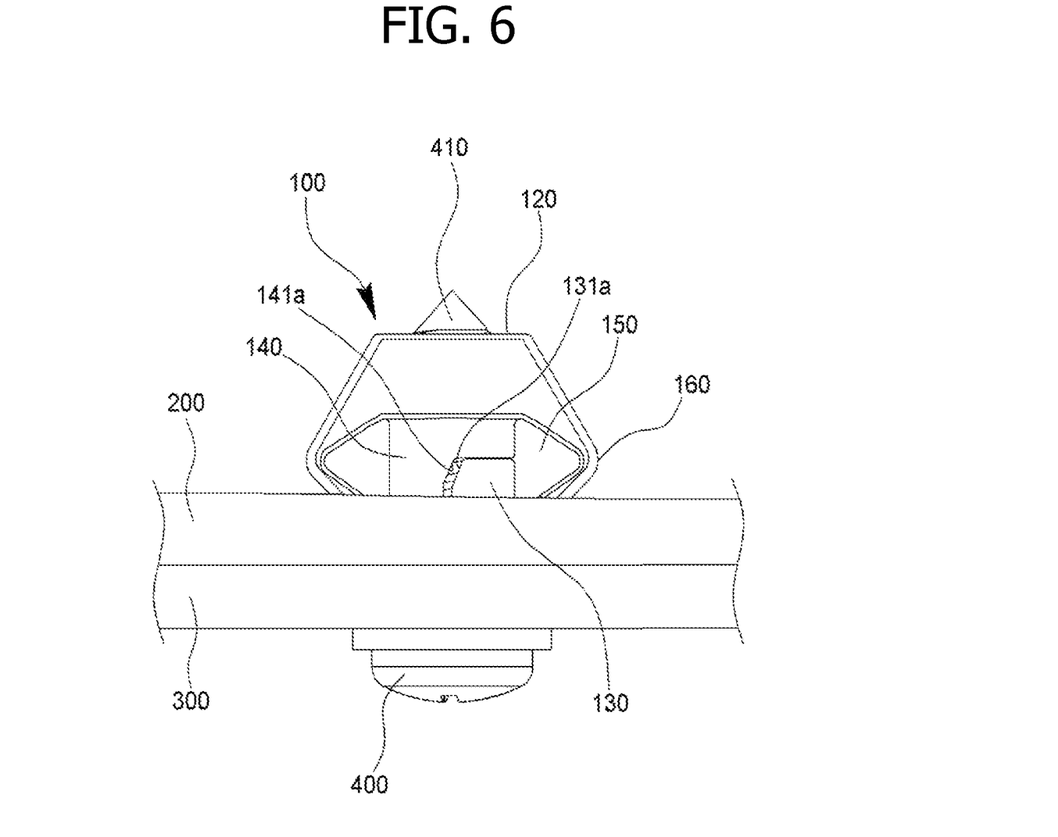
FIG. 6 is a front view showing a state that a member and another member are coupled to push nuts for cars according to an embodiment.
Figure 7:
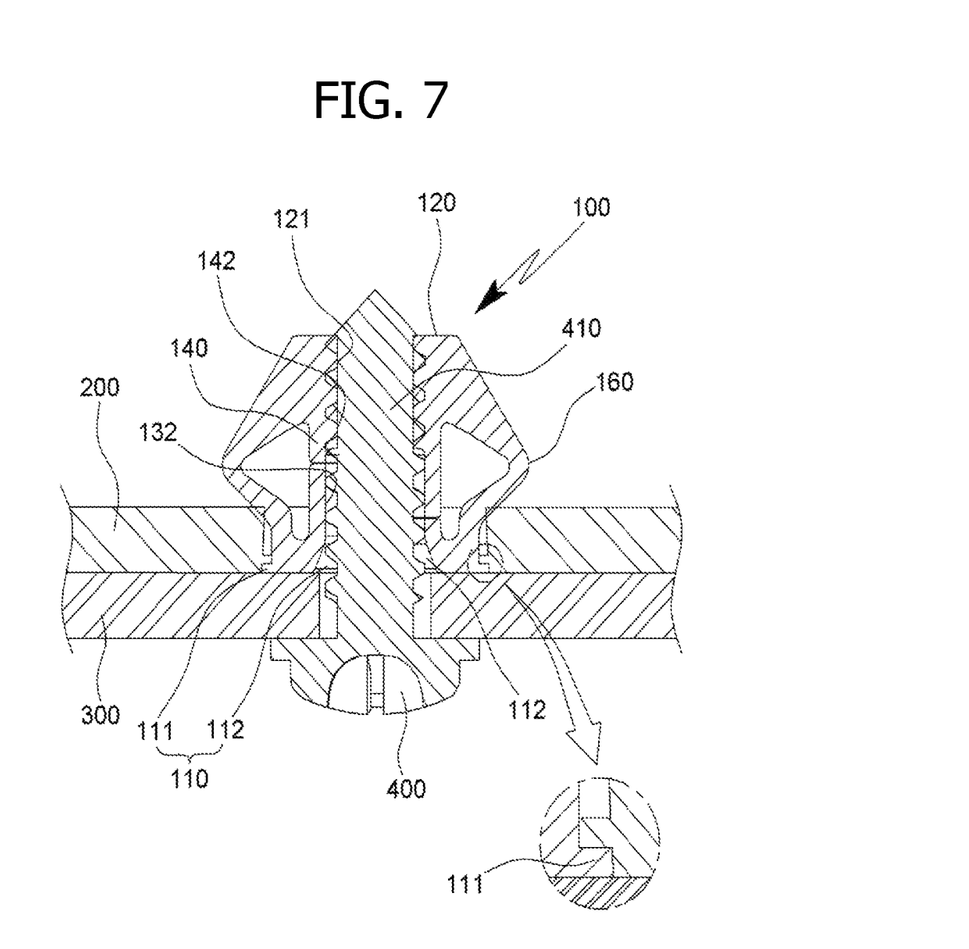
FIG. 7 is a cross-sectional view showing a state that a member and another member are coupled to push nuts for cars according to an embodiment.
Figure 8A:
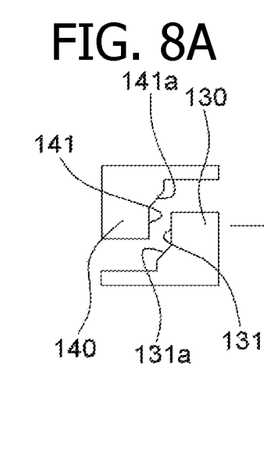
FIGS. 8A-8D are operational state views with key features magnified, schematically showing states that the head axial support and the body axial support according to an embodiment change depending on the fastening extent of the fastening member.
Figure 8B:
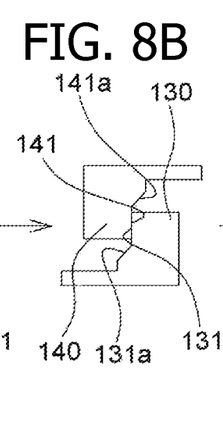
Figure 8C:
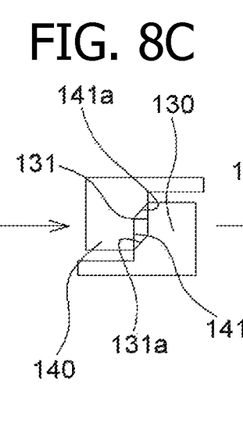
Figure 8D:
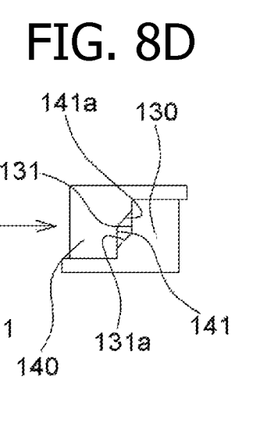

FIG. 1 is a perspective view showing push nuts for cars the present invention. FIG. 2 is a cross-sectional view showing push nuts for cars of the present invention. FIG. 3 is an exploded perspective view showing a state of use of push nuts for cars of the present invention. FIG. 4 is a front view showing a state before a member and another member are coupled by push nuts for cars of the present invention. FIG. 5 is a cross-sectional view showing a state before a member and another member are coupled to push nuts for cars of the present invention. FIG. 6 is a front view showing a state that a member and another member are coupled to push nuts for cars of the present invention. FIG. 7 is a cross-sectional view showing a state that a member and another member are coupled to push nuts for cars of the present invention. FIGS. 8A, 8B, 8C, and 8D (collectively, FIG. 8) are operational state views with key features magnified, schematically showing states that the head axial support and the body axial support of the present invention change depending on the fastening extent of the fastening member.

Push nuts for cars of the present invention are as shown in FIG. 1 to FIG. 8, comprising a head 110 having a member contact surface 111 formed protruding at left and right sides, and having a fastening hole 112 formed penetratingly at a central part; and a body 120 having a fastening hole 121 formed penetratingly at a central part, the fastening hole 121 having the same center and inner diameter as the fastening hole 112 that is formed at the head 110.

Meanwhile, the body 120 and the head 110 are connected by a connecting bridge 160 that has an elastic deformation outwardly according to the fastening extent of a fastening member 400 such as a screw, and the head 110 and the body 120 connected by the connecting bridge 160 respectively have a head axial force support 140 and a body axial force support 130 formed protruding toward a space 150 respectively, the head axial force support 140 and the body axial force support 130 respectively having fastening holes 132, 142, which have the same center as the fastening holes 112, 121, formed penetratingly.

Meanwhile, the head axial force support 140 and the body axial force support 130 have contact surfaces 141, 131 formed cut and mutually opposite to each other.

Moreover, an upper portion of the contact surface 141 of the head axial force support 140 and a lower portion of the contact surface 131 of the body axial force support 130 have rotation direction supports 131a, 141a respectively formed in a slope in order to prevent deformation due to excessive fastening with a fastening member 400 such as a screw.

In the present invention configured as above, when the body 120 is pushed into the hole 210 formed in the member 200, the connecting bridge 160 is elastically deformed and the body is easily inserted such that the member contact surface 111 of the head 110 comes in close contact with the outer side surface of the member 200.

At this time, after the head 110 is pushed into the hole 210 formed on the member 200 such that the member contact surface 111 of the head 110 contacts the outer side surface of the member 200, the connecting bridge 160 connecting the head 110 and the body 120 that have been led into the hole 210 such that the member contact surface 111 contacts the outer side surface of the member 200 is elastically deformed to the original shape while being opened, thereby remaining being fixed without falling out of the member 200 and maintaining the state that push nuts 100 are installed fixedly on the member 200.

After installing push nuts 100 fixedly on the member 200 as explained above, at a state where the center of the hole 310 formed in another member 300 to be coupled coincides with the center of the fastening hole 112 formed in the head 110, a fastening member 400 such as a screw is fitted into a fastening hole 112 of the head 110 through a hole 210 and then turned in a tightening direction; then, the fastening portion 410 of the fastening member 400 is sequentially fastened through the fastening hole 142 formed in the head axial support 140 formed on the head 110, the fastening hole 132 formed in the body axial support 130 and the fastening hole 121 formed in the body 120.

At this time, the internal walls of the fastening holes 112, 121, 132, 142 are tapped for easy fastening with the fastening portion 410 of the fastening member 400 such as a screw, and thus coupling and decoupling are made with the fastening holes 112, 121, 132, 142 by the fastening portion 410 of the fastening member 400 rotating in one or the other direction.

Meanwhile, the body 120 moves in the direction of the head 110 by the screw motion of the fastening portion 410 of the fastening member 400 where fastening is made with the fastening hole 121 formed in the body 120 and the fastening hole 132 formed in the body axial support 130, and the connecting bridge 160 is elastically deformed such that it is opened as much as the body 120 moves, wherein the body 120 moves as much as the extent of fastening that the movement is made in the direction of the head 110, and thus is fixed such that it does not fall out of the member 200.

At this time, the contact surfaces 131, 141 formed on the head axial support 140 and the body axial support 130 are pulled by the fastening force of the fastening member 400 such as a screw, thereby maintaining the mutual contact while the body 120 moves in a direction of the space 150, and after the movement in the direction of the space 150 as such, the upper end and the lower end are respectively contacted by the rotation direction supports 141a, 131a formed in a slope on an upper portion of the contact surface 141 of the head axial support 140 and a lower portion of the contact surface 131 of the body axial support 130, and guided to be moved, such that the contact surfaces 131, 141 formed on the head axial support 140 and the body axial support 130, while maintaining the separated state, are prevented from deformation in the transverse direction by the fastening force of the fastening member 400 such as a screw.

Meanwhile, as explained above, fastening by the fastening member 400 such as a screw is made as far as where the lower end of the body axial support 130 is in contact with the upper end of the head axial support 140 as guided by the contact surfaces 131, 141, thereby preventing damage to the push nuts 100 by excessive fastening.

DESCRIPTION OF REFERENCE NUMERALS

100: push nuts
111: member contact surface
112, 121, 132, 142: fastening hole
110: head
120: body
130: body axial support 131, 141: contact surfaces
131a, 141a: rotation direction supports
140: head axial support
150: space
160: connecting bridge
400: fastening member When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A push nut for a vehicle, comprising:
a head having a member contact surface formed protruding at left and right sides, and having a fastening hole formed penetratingly at a central part; and
a body having a fastening hole formed penetratingly at a central part, the fastening hole having the same center and inner diameter as the fastening hole that is formed at the head,
wherein the body and the head are connected by a connecting bridge, and the head and the body connected by the connecting bridge respectively have a head axial force support and a body axial force support formed protruding toward a space respectively, the head axial force support and the body axial force support respectively having fastening holes, which have the same center as the fastening holes, formed penetratingly,
wherein the connecting body is elastically deformable outwardly as a fastening force of a fastening member pulls the head axial force support and the body axial force support toward each other,
wherein the head axial force support and the body axial force support have contact surfaces formed cut and mutually opposite to each other, the contact surface of the head axial force support and the contact surface of the body axial force support maintain mutual contact with each other when the fastening force of the fastening member pulls the head axial force support and the body axial force support together, and
wherein an upper portion of the contact surface of the head axial force support and a lower portion of the contact surface of the body axial force support have rotation direction supports respectively formed in a slope in order to prevent deformation due to excessive fastening with a fastening member such as a screw.

2. A push nut for a vehicle, comprising:
a head having a member contact surface formed protruding at left and right sides, and having a fastening hole formed penetratingly at a central part; and
a body having a fastening hole formed penetratingly at a central part, the fastening hole having the same center and inner diameter as the fastening hole that is formed at the head,
wherein the body and the head are connected by a connecting bridge, and the head and the body connected by the connecting bridge respectively have a head axial force support and a body axial force support formed protruding toward a space respectively, the head axial force support and the body axial force support respectively having fastening holes, which have the same center as the fastening holes, formed penetratingly,
wherein the connecting body is elastically deformable outwardly as a fastening force of a fastening member pulls the head axial force support and the body axial force support toward each other,
wherein the head axial force support and the body axial force support have contact surfaces formed cut and mutually opposite to each other, the contact surface of the head axial force support and the contact surface of the body axial force support maintain mutual contact with each other when the fastening force of the fastening member pulls the head axial force support and the body axial force support together, and
wherein the internal walls of the fastening holes are tapped for easy fastening with a fastening portion of the fastening member such as a screw.

* * * * *